US012421790B2

(12) United States Patent
Goldfinch et al.

(10) Patent No.: US 12,421,790 B2
(45) **Date of Patent: *Sep. 23, 2025**

(54) TOP-HANGING SLIDING DOOR INCLUDING BOTTOM GUIDE AND SEAL

(71) Applicant: AD Solutions, Inc., Carmel, IN (US)

(72) Inventors: Gregory J. Goldfinch, Everett, WA (US); Robert Allen Larson, Jr., Everett, WA (US); Dustin Dale Swartz, Bothell, WA (US)

(73) Assignee: AD SOLUTIONS, INC., Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,147

(22) Filed: Mar. 11, 2022

(65) Prior Publication Data

US 2022/0372816 A1 Nov. 24, 2022

Related U.S. Application Data

(63) Continuation of application No. 16/475,647, filed as application No. PCT/US2017/067690 on Dec. 20, 2017, now Pat. No. 11,274,490.

(Continued)

(51) Int. Cl.
*E06B 7/215* (2006.01)
*E05D 15/06* (2006.01)

(Continued)

(52) U.S. Cl.
CPC .......... *E06B 7/215* (2013.01); *E05D 15/0626* (2013.01); *E05D 15/0656* (2013.01);

(Continued)

(58) Field of Classification Search
CPC .......... E06B 7/215; E06B 7/20; E06B 7/2316; E06B 7/21; E05D 15/0626
See application file for complete search history.

(56) References Cited

U.S. PATENT DOCUMENTS

| | | | | |
|---|---|---|---|---|
| 1,489,734 A | | 4/1924 | Brasch | |
| 2,035,723 A | * | 3/1936 | Robinson | E06B 7/20 49/307 |

(Continued)

FOREIGN PATENT DOCUMENTS

| | | |
|---|---|---|
| CA | 2434348 A1 | 1/2004 |
| CH | 704410 A1 | 7/2012 |

(Continued)

OTHER PUBLICATIONS

International Search Report and Written Opinion, mailed Mar. 19, 2018, for International Application No. PCT/US2017/067690, 14 pages.

(Continued)

*Primary Examiner* — Marcus Menezes
(74) *Attorney, Agent, or Firm* — Seed Intellectual Property Law Group LLP

(57) ABSTRACT

Systems and methods for providing a drop seal assembly which is concealed within an opening in the bottom of a sliding door panel of a top-hanging sliding door. The drop seal assembly may include bottom guide which defines a downward facing elongated slot or track which receives a sill guide therein. The drop seal assembly also includes a drop down acoustic seal which automatically drops down to contact the floor surface below the door panel when the door panel is moved from an open position into a closed position. The distance that the seal drops down upon closing of the door panel may be selectively adjustable to accommodate variances in the air gap between the door bottom and the floor surface due to particular installation conditions. A concealed magnetic bottom seal activator may be used to provide self-adjusting activation of the door bottom seal assembly using two opposing magnets.

12 Claims, 15 Drawing Sheets

Related U.S. Application Data

(60) Provisional application No. 62/442,623, filed on Jan. 5, 2017.

(51) Int. Cl.
*E06B 7/20* (2006.01)
*E06B 7/21* (2006.01)
*E06B 7/23* (2006.01)
*E06B 5/20* (2006.01)

(52) U.S. Cl.
CPC .................. *E06B 7/20* (2013.01); *E06B 7/21* (2013.01); *E06B 7/2316* (2013.01); *E05Y 2900/132* (2013.01); *E06B 5/20* (2013.01)

(56) References Cited

U.S. PATENT DOCUMENTS

| | | | | |
|---|---|---|---|---|
| 3,604,152 | A | 9/1971 | Protzman | |
| 4,852,302 | A | 8/1989 | Berniola Gil | |
| 6,108,989 | A * | 8/2000 | Kordes | E05C 17/48 52/64 |
| 2013/0097935 | A1 | 4/2013 | Sprague | |
| 2016/0069125 | A1 | 3/2016 | Kleiner et al. | |
| 2016/0075348 | A1 | 3/2016 | Kim et al. | |
| 2017/0306692 | A1 | 10/2017 | Meng | |
| 2018/0291674 | A1 | 10/2018 | Dintheer | |
| 2019/0128054 | A1 * | 5/2019 | Dintheer | E06B 3/46 |
| 2019/0136609 | A1 | 5/2019 | Dintheer et al. | |

FOREIGN PATENT DOCUMENTS

| | | | | |
|---|---|---|---|---|
| CN | 204252788 | U | 4/2015 | |
| DE | 800020 | C | 8/1950 | |
| DE | 2627564 | A1 | 12/1977 | |
| DE | 4014106 | A1 | 11/1991 | |
| DE | 102015000197 | A1 | 7/2016 | |
| DE | 102016116197 | A1 * | 3/2018 | E06B 3/46 |
| DE | 102017117573 | A1 | 2/2019 | |
| EP | 0221207 | A1 | 5/1987 | |
| EP | 1447514 | A2 * | 8/2004 | E06B 7/215 |
| EP | 1717405 | A1 | 11/2006 | |
| EP | 2088277 | A2 | 8/2009 | |
| EP | 2402546 | A2 | 1/2012 | |
| EP | 2476857 | A2 | 7/2012 | |
| EP | 3524765 | A1 | 8/2019 | |
| EP | 3365524 | B1 * | 9/2022 | E06B 3/4609 |
| FR | 1238196 | A | 10/1959 | |
| FR | 3052180 | A1 | 12/2017 | |
| GB | 191108476 | A | 4/1912 | |
| JP | H07317457 | A | 12/1995 | |
| JP | H10280827 | A | 10/1998 | |
| JP | H10331547 | A | 12/1998 | |
| JP | 2005009278 | A | 1/2005 | |
| JP | 2010180527 | A | 8/2010 | |
| WO | WO 9500735 | A1 | 1/1995 | |
| WO | WO-2017190779 | A1 * | 11/2017 | E06B 3/46 |

OTHER PUBLICATIONS

Supplementary European Search Report, mailed Jul. 10, 2020, for European Application No. 17889625.4-1002, 18 pages.

* cited by examiner

TOP-HANGING SLIDING DOOR INCLUDING BOTTOM GUIDE AND SEAL

BACKGROUND

Technical Field

The present disclosure generally relates to sliding doors, and more particularly, to top-hanging sliding doors that include bottom acoustic seals.

Description of the Related Art

In various environments, sliding doors may be used to provide space savings and other benefits. Such environments may include medical clinics, hospital exam rooms, toilet rooms or restrooms, corporate office settings, etc., where in particular the space savings and other functionality of sliding doors may be desired. Some sliding doors may be "top-hanging" on a door frame with no exposed floor track and may be designed to roll on a track positioned at the top of the door frame. In some environments, it may be desirable to provide sliding doors which have a relatively low sound transmission to provide enhanced privacy and noise reduction between the two areas which are separated by a sliding door. To date, perimeter gaps inherent in sliding doors have presented considerable challenges for acoustic transmission performance in sliding doors.

BRIEF SUMMARY

A door seal system for a top-hanging sliding door, the top-hanging sliding door including a door frame which supports a door panel that is slideable between an open position and a closed position, may be summarized as including a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position.

The carriage of the drop seal assembly may include a fixed pin, and the drop seal assembly may further include an elongated guide bar which is fixed relative to the door panel, the guide bar may include an angled slot therein which receives the fixed pin of the carriage, and the fixed pin may ride in the angled slot responsive to the horizontal force imparted on the carriage by the drop seal assembly activator to control movement of the carriage between the raised position and the lowered position.

The drop seal assembly may further include at least one spring coupled between the elongated guide bar and the carriage, the at least one spring may bias the carriage in the raised position. The angled slot of the elongated guide bar may be disposed at an angle that is between 30 degrees and 45 degrees with respect to horizontal.

The drop seal assembly may further include a bearing coupled to the carriage proximate a trailing end of the door panel, and the drop seal assembly activator may include a sill guide which has a bearing surface which contacts the bearing when the door panel is moved from the open position to the closed position. The horizontal position of the bearing surface of the sill guide may be selectively adjustable and the horizontal position of the bearing surface of the sill guide may control the height of the carriage when the carriage is in the lowered position. The drop seal assembly activator may be self-adjusting to cause the elastic seal to contact the floor surface below the door panel when the door panel is in the closed position when the floor surface is spaced apart from the bottom portion of the door panel by any distance within a determined range of distances. The drop seal assembly may include a first magnet coupled to a leading end of the carriage, and the drop seal assembly activator may include a second magnet coupled to the door frame, and when the door panel is moved from the open position toward the closed position the second magnet may repel the first magnet which imparts the horizontal force to the carriage of the drop seal assembly to cause the carriage to move from the raised position to the lowered position. The door panel may be in the closed position, the first magnet may be spaced apart from the second magnet by an air gap.

A top-hanging sliding door may be summarized as including a door frame; a door panel supported by the door frame, the door panel comprising a bottom portion having a downward facing opening therein and being slideable between an open position and a closed position; and a door seal system, comprising: a drop seal assembly disposed at least partially within the downward facing opening of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position.

The carriage of the drop seal assembly may include a fixed pin, and the drop seal assembly may further include an elongated guide bar which may be fixed relative to the door panel, the guide bar may include an angled slot therein which may receive the fixed pin of the carriage, and the fixed pin may ride in the angled slot responsive to the horizontal force imparted on the carriage by the drop seal assembly activator to control movement of the carriage between the raised position and the lowered position.

The drop seal assembly may further include at least one spring coupled between the elongated guide bar and the carriage, the at least one spring biases the carriage in the raised position. The angled slot of the elongated guide bar may be disposed at an angle that is between 30 degrees and 45 degrees with respect to horizontal.

The drop seal assembly may further include a bearing coupled to the carriage proximate a trailing end of the door panel, and the drop seal assembly activator may include a sill guide which has a bearing surface which contacts the bearing when the door panel is moved from the open position to the closed position. The horizontal position of the bearing surface of the sill guide may be selectively adjustable and the horizontal position of the bearing surface of the sill guide may control the height of the carriage when the carriage is in the lowered position. The drop seal assembly activator may be self-adjusting to cause the elastic seal to contact the floor surface below the door panel when the door panel is in the closed position when the floor surface is spaced apart from the bottom portion of the door panel by any distance within a determined range of distances. The drop seal assembly may include a first magnet coupled to a leading end of the carriage, and the drop seal assembly activator may include a second magnet coupled to the door frame, and when the door panel is moved from the open position toward the closed position the second magnet repels the first magnet which imparts the horizontal force to the carriage of the drop seal assembly to cause the carriage to move from the raised position to the lowered position. The door panel may be in the closed position, the first magnet may be spaced apart from the second magnet by an air gap.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
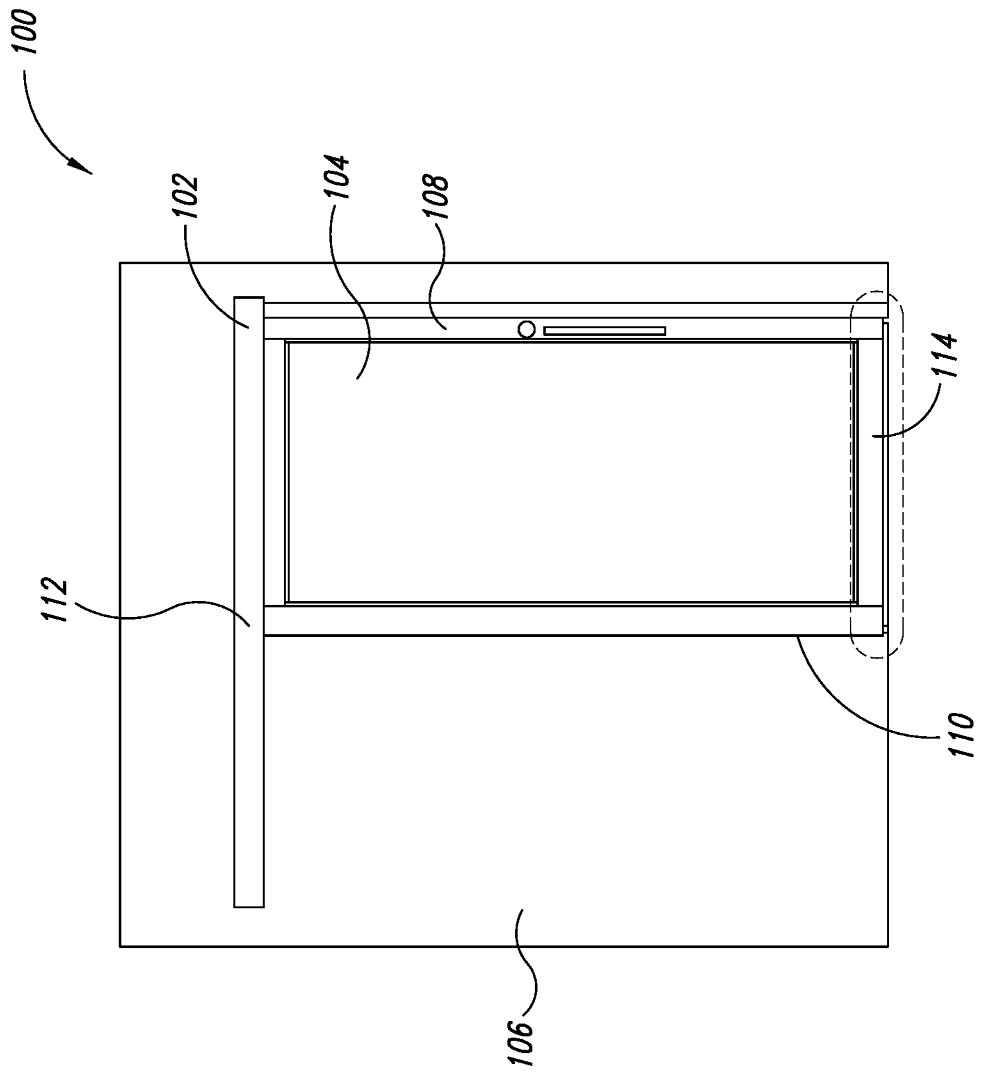
FIG. 1 is an elevational view of top-hanging sliding door which includes a bottom acoustic seal, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to a drop seal assembly which is concealed within an opening in the bottom of a sliding door panel of a top-hanging sliding door. The drop seal assembly may include bottom sill guide which defines a downward facing elongated slot or track which receives a sill guide therein such that the bottom sill guide functions a retainer to keep the bottom of the sliding door panel in place and does not allow the door panel to swing out and away from the door frame. The drop seal assembly also includes a drop down acoustic seal which automatically drops down to contact the floor surface below the door panel when the door panel is moved from an open position into a closed position to provide an acoustic barrier at the bottom of the door panel when the door is in the closed position.

The distance that the seal drops down upon closing of the door panel, sometimes referred to herein as the "extension distance" or "drop distance," may be selectively adjustable to accommodate variances in the air gap between the bottom of the door panel and the floor surface due to particular installation conditions. As discussed further below, in at least some implementations this adjustment feature is provided by an adjustable sill guide which interacts with the drop seal assembly when the door panel is moved into the closed position. The adjustable sill guide may be movable between a plurality of different positions, wherein each of the plurality of positions provides a different drop distance for the seal when the door panel is in the closed position.

In at least some other implementations, rather than the adjustable sill guide, a concealed magnetic bottom seal activator is used to provide self-adjusting activation of the door bottom seal assembly using two opposing magnets. In such implementations, a fixed sill guide may still be used as a retainer to prevent the bottom of the door panel from swinging out away from the door frame. One of the magnets may be placed on a stile pocket of the door frame, and the other magnet may be mounted to a leading edge of a movable drop portion of the drop seal assembly. The magnets may be arranged to be in opposing reverse polarity such that when the door panel is moved to the closed position from the open position, the magnet on the movably drop seal assembly comes into close proximity with the magnet fixed on the door frame. The horizontal opposing magnetic force is transformed into a vertical force, as discussed further below, which forces the seal downward into contact with the floor surface below the door panel. In such implementations, an air gap between the two magnets when the door panel is in the closed position may allow for a variance in the distance that the seal extends downward to be absorbed without requiring any manual adjustment mechanism.

FIG. 1 shows a front elevational view of a top-hanging sliding door 100 which includes a door frame 102 that supports a sliding door panel or leaf 104. The door panel 104 is movable between a closed position (as shown) wherein the door panel covers an opening in a wall 106 and an open position wherein the door panel is moved to the left to expose the door opening in the wall. In other implementations, the top-hanging sliding door 100 may be configured to open to the right ("right opening" or "right handed") rather than open to the left ("left opening" or "left handed"). The door panel 104 includes a leading edge 108 and a trailing edge 110 opposite the leading edge. The door panel 104 maybe top-hanging from a track disposed in a top portion 112 of the door frame 102 with no exposed floor track at a bottom 114 of the door panel, such that there is an air gap between the bottom 114 of the door panel and a floor surface below the bottom of the door panel. As discussed below with reference to FIGS. 2-15B, the bottom 114 of the door panel 104 includes a downward facing opening 116 (see FIG. 9) which receives a drop seal assembly that includes a seal which automatically drops downward to the floor surface when the door panel is moved into the closed position.

Figure 2:
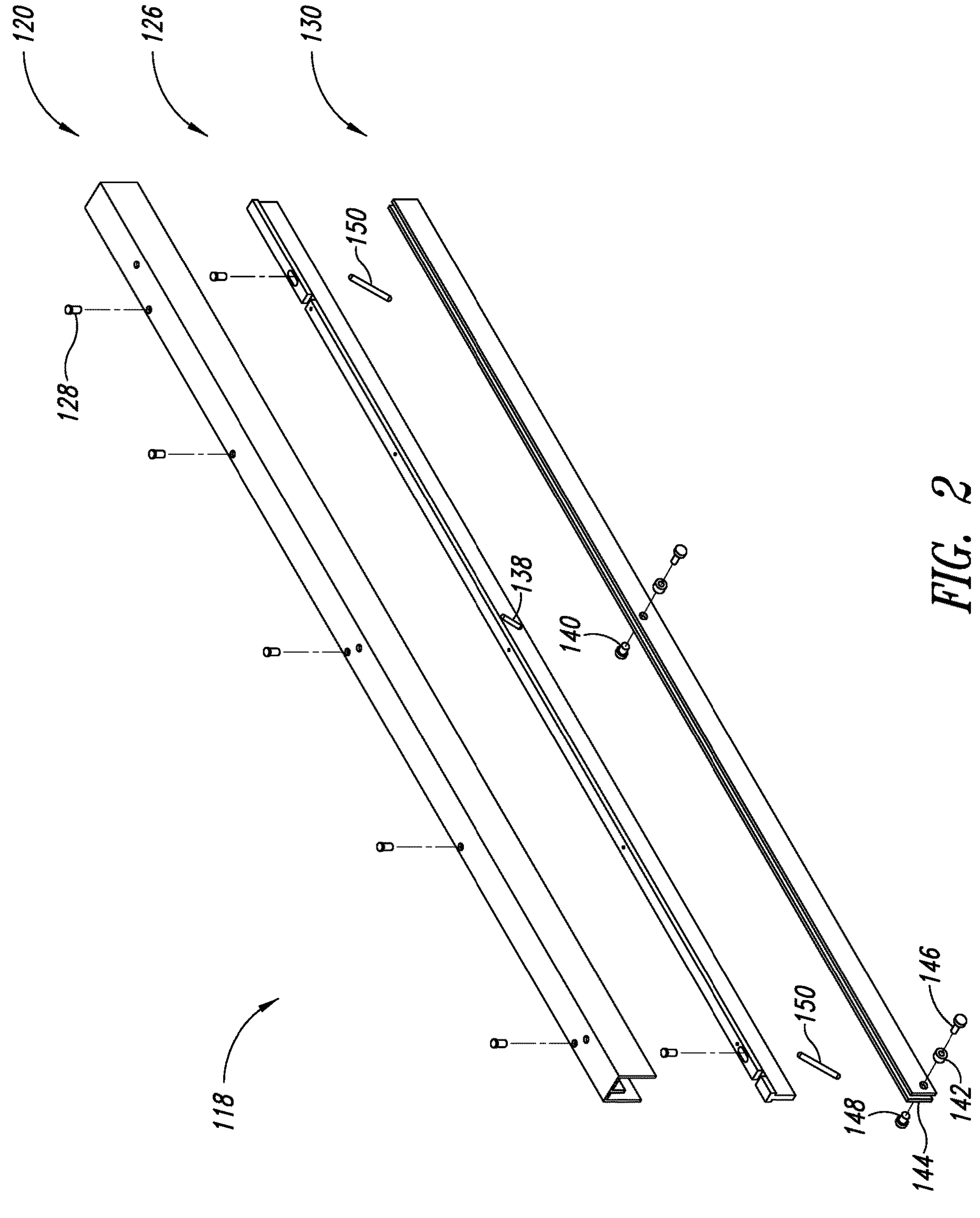
FIG. 2 is an exploded perspective view of a drop seal assembly, according to one illustrated implementation.
Figure 3:
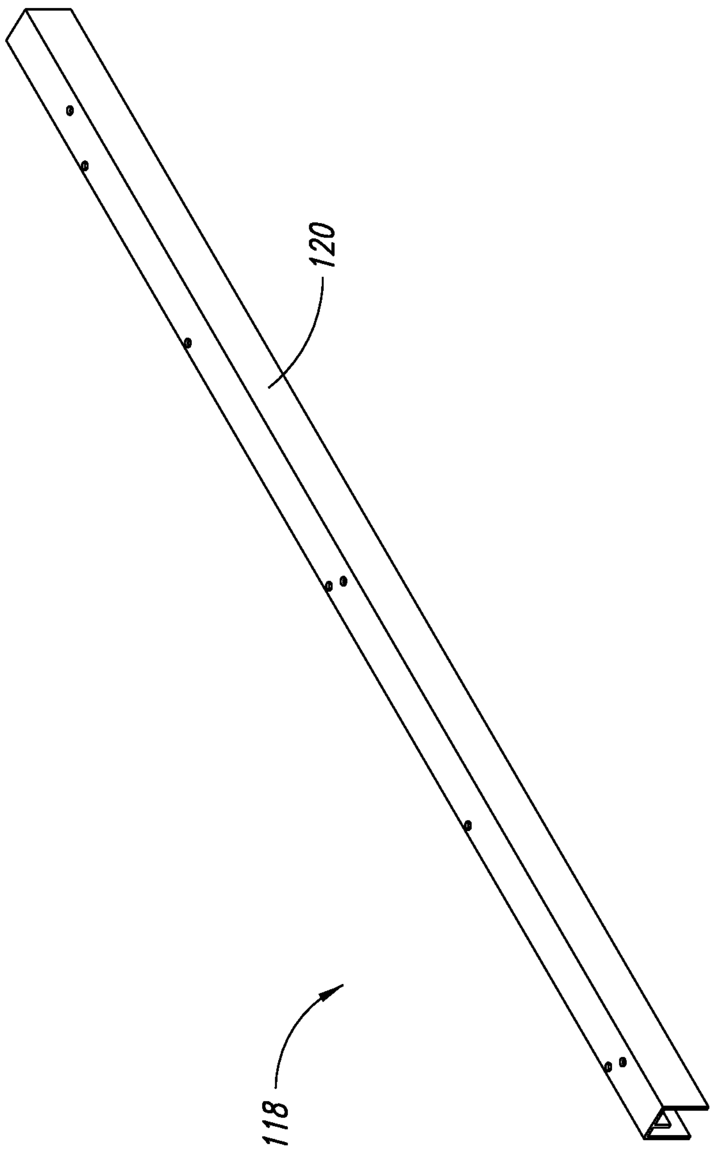
FIG. 3 is a perspective view of the drop seal assembly in assembled form, according to one illustrated implementation.
Figure 4A:
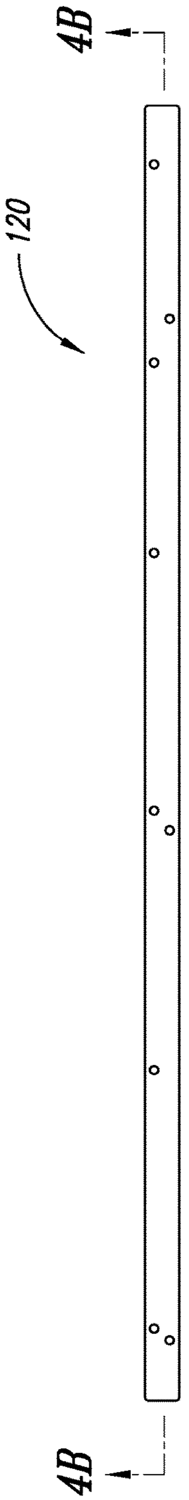
FIG. 4A is a top view of an E-channel extrusion of the drop seal assembly, according to one illustrated implementation.
Figure 4B:
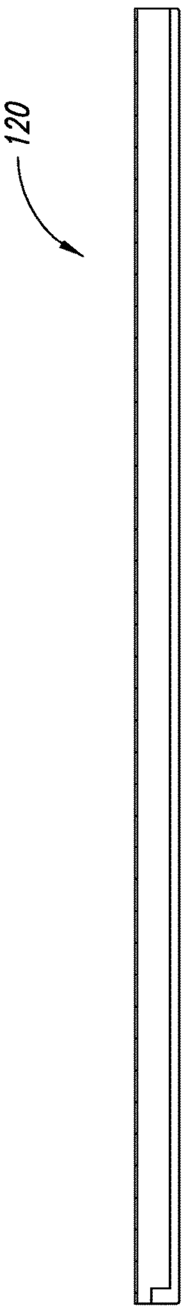
FIG. 4B is a sectional view of the E-channel extrusion of the drop seal assembly, according to one illustrated implementation.
Figure 4C:
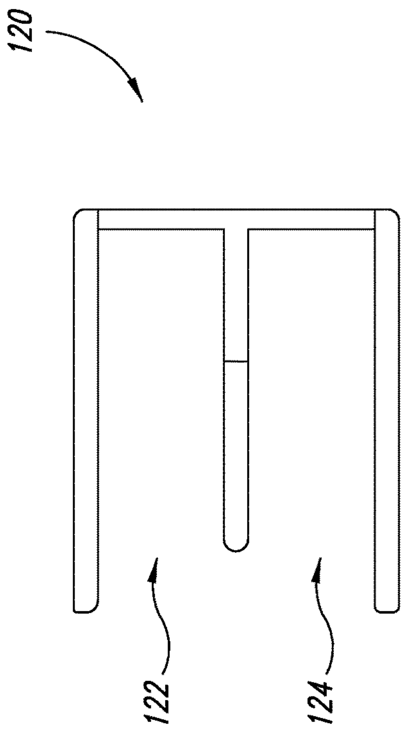
FIG. 4C is an end view of the E-channel extrusion of the drop seal assembly, according to one illustrated implementation.
Figure 5A:
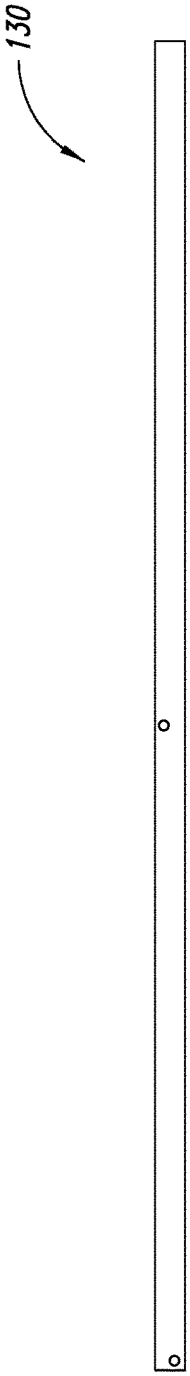
FIG. 5A is an elevational view of a carriage extrusion of the drop seal assembly, according to one illustrated implementation.
Figure 5B:
FIG. 5B is a top view of the carriage extrusion of the drop seal assembly, according to one illustrated implementation.
Figure 5C:
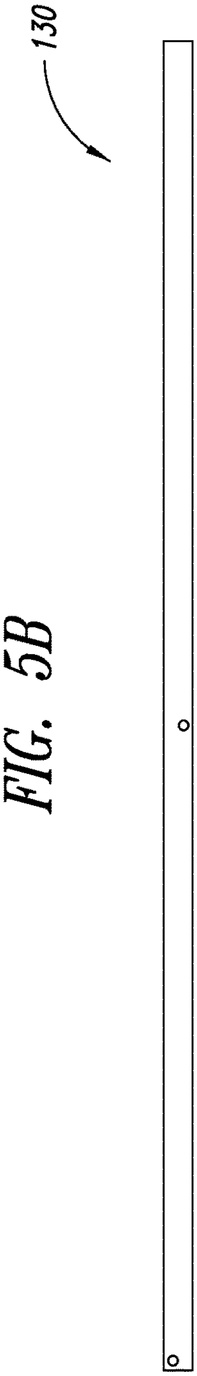
FIG. 5C is an elevational view of the carriage extrusion of the drop seal assembly when the carriage extrusion is inverted, according to one illustrated implementation.
Figure 5D:
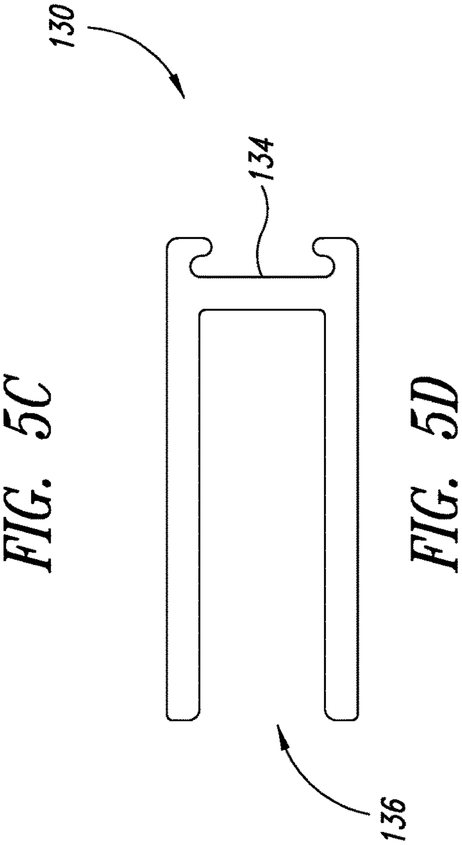
FIG. 5D is an end view of the carriage extrusion of the drop seal assembly, according to one illustrated implementation.
Figure 6A:
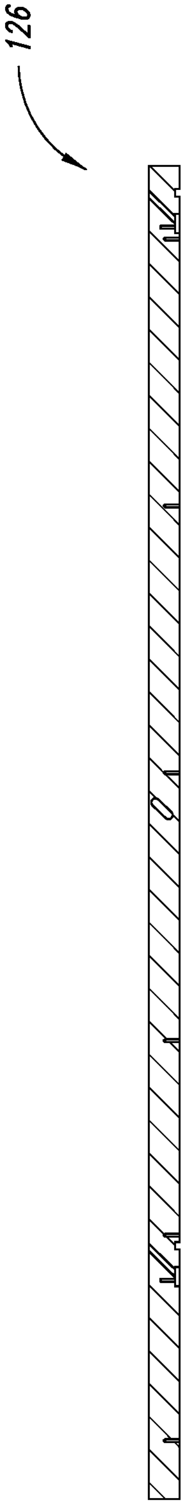
FIG. 6A is an elevational view of an elongated guide bar of the drop seal assembly, according to one illustrated implementation.
Figure 6B:
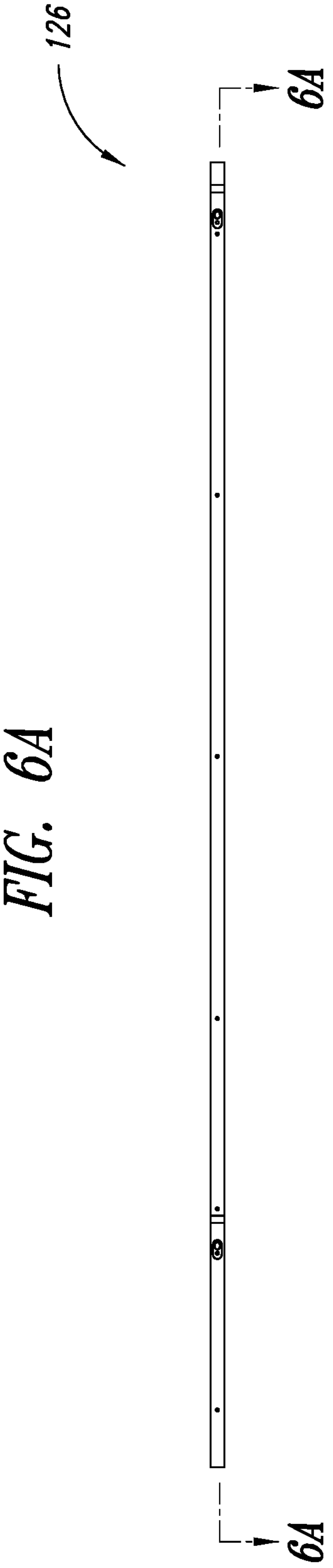
FIG. 6B is a top view of the elongated guide bar of the drop seal assembly, according to one illustrated implementation.
Figure 6C:
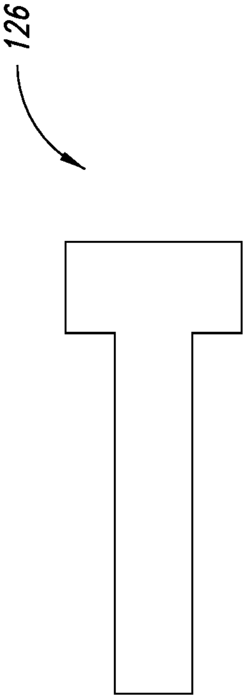
FIG. 6C is an end view of the elongated guide bar of the drop seal assembly, according to one illustrated implementation.
Figure 9:
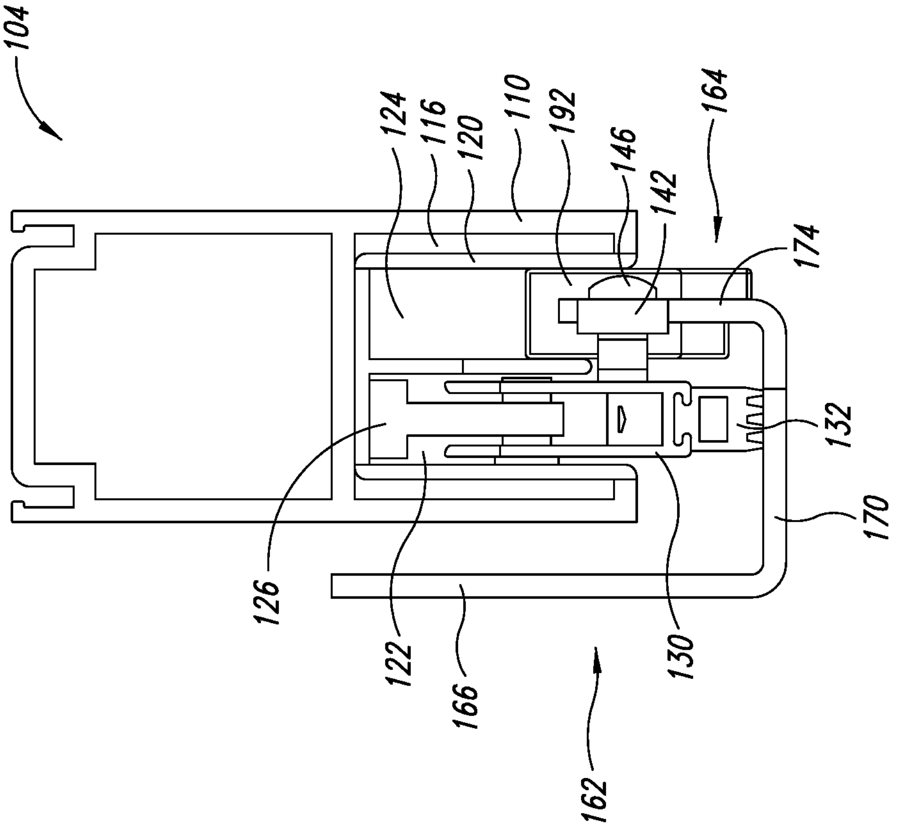
FIG. 9 is an end view of a bottom of a door panel, the drop seal assembly of FIG. 3, and the sill guide of FIGS. 7A-7C, according to one illustrated implementation.

FIGS. 2-6C show various views of a drop seal assembly 118 which may be fixedly positioned within the downward facing opening 116 of the door panel 104. As shown in FIG. 2, the drop seal assembly 118 includes an elongated E-channel extrusion 120 which includes a seal channel 122 (see FIG. 4C) and a sill guide channel 124. As shown in FIG. 9, the E-channel extrusion 120 may be positioned within the downward facing opening 116 in the bottom 114 of the door panel 104.

The drop seal assembly 118 also includes an elongated guide bar 126 that is fixedly coupled to the E-channel extrusion 120 using a plurality of screws 128. The drop seal assembly 118 further includes an elongated carriage extrusion 130 which has a seal 132 (FIG. 9) attached to bottom side 134 (FIG. 5D) of the carriage extrusion, and an upward facing channel 136 to receive the guide bar 126 therein. The guide bar 126 includes a centrally located angled glide slot 138 therein which receives a pin 140 which passes through the upward facing channel 136 when the guide bar 126 is disposed within the upward facing channel of the carriage extrusion 130. The glide slot 138 may be at any suitable angle, such as 45 degrees, 30 degrees, etc. Thus, the pin 140 rides in the guide slot 138 such that when a horizontal force is applied to the carriage extrusion 130, the horizontal force is partially transformed into a vertical force which causes the carriage extrusion to move vertically relative to the vertically fixed components (e.g., the guide bar 126, the E-channel extrusion 120, the door panel 104). As discussed further below, this action causes the seal 132 to automatically move from a raised position wherein the seal is spaced apart from the floor surface to a lowered position wherein the seal is in contact with the floor surface.

A wheel bearing 142 may be fixedly attached to the carriage extrusion 130 proximate the trailing edge 144 thereof. The wheel bearing 142 may be held in place by a screw 146 and a standoff 148, for example. As shown in FIG. 9, the wheel bearing 142 extends outward from the carriage extrusion 130 and is substantially aligned with the sill guide channel 124 of the E-channel extrusion 120 to interact with an adjustable sill guide, as discussed below.

The carriage extrusion 130 may also be coupled to the guide bar 126 via one or more springs 150, which springs bias the carriage extrusion 130 in the raised position to prevent the seal 132 from contacting the floor surface when the door panel 104 is in the open position. As discussed further below, when a horizontal force is applied to the carriage extrusion 130, the carriage extrusion moves vertically due to the pin 140 riding in the guide slot 138 and overcomes the biasing force provided by the springs 150.

Figure 7B:
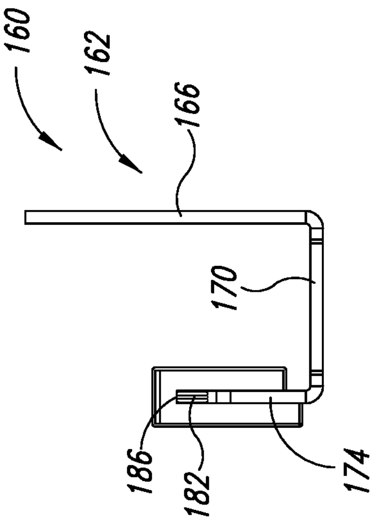
FIG. 7B is an end view of the adjustable sill guide of FIG. 7A, according to one illustrated implementation.
Figure 7C:
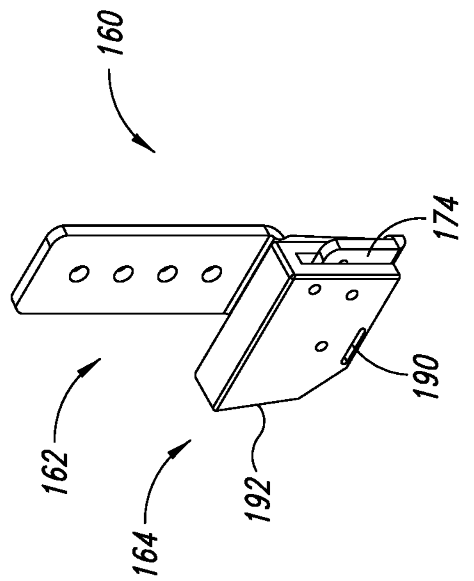
FIG. 7C is an isometric view of the adjustable sill guide of FIG. 7A in assembled form, according to one illustrated implementation.
Figure 7A:
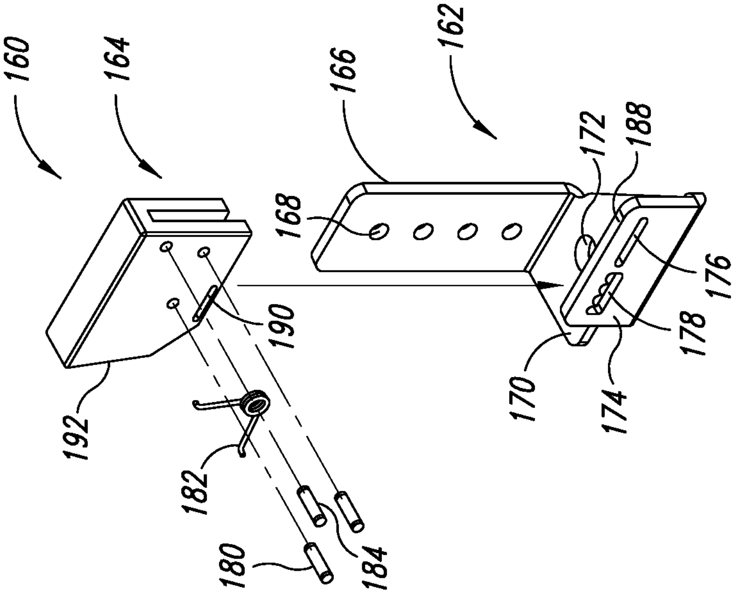
FIG. 7A is an exploded isometric view of an adjustable sill guide for a sliding door panel which opens to the left, according to one illustrated implementation.

FIGS. 7A-7C show various views of an adjustable sill guide 160 which operates as a drop seal assembly activator. The adjustable sill guide 160 includes a metal bracket 162 and an adjustable bumper or bushing 164. The metal bracket 162 includes a first vertical portion 166 which includes four holes 168 therein that receive respective screws (not shown) to allow the metal bracket to be secured to the door frame 102 proximate the trailing edge 110 of the door panel 104 when the door panel is in the closed position. The metal bracket 162 also includes a horizontal portion 170 extending outward from the first vertical portion 166 which includes a countersink hole 172 which receives a screw to fasten the metal bracket to the flooring. The metal bracket 162 also includes a second vertical portion 174 that extends upward from an outermost portion of the horizontal portion 170. The second vertical portion 174 supports the adjustable bumper 164 and includes a smooth elongated slot 176 and a slot 178 with four detent locations on an upper surface thereof.

A pin 180 (FIG. 7A) detents into one of the four detent locations in the slot 178. A spring 182, maintained by a pin 184 which provides a rotational axis for the bumper 164, imparts an upward force on the bumper to maintain the pin 182 in one of the four detent locations of the slot 178. The spring 182 is compressed between an inner downward facing surface 186 (FIG. 7B) of the bumper 164 and a top surface 188 (FIG. 7A) of the second vertical portion 174 of the metal bracket 162. The bumper 164 includes an adjustment slot 190 at the bottom thereof (e.g., at least partially below the bottom 114 of the door panel 104) which receives a screwdriver or other tool to allow the user to rotate the bumper downward about the pin 184, which disengages the pin 180 out of the detent locations of the slot 178 and allows the user to slide the bumper 164 horizontally back and forth. When the user releases downward force applied to the bumper 164, the spring 182 imparts the upward rotational force on the bumper 164 to automatically maintain the pin 180 in one of the four detent locations of the slot 178.

Figure 10A:
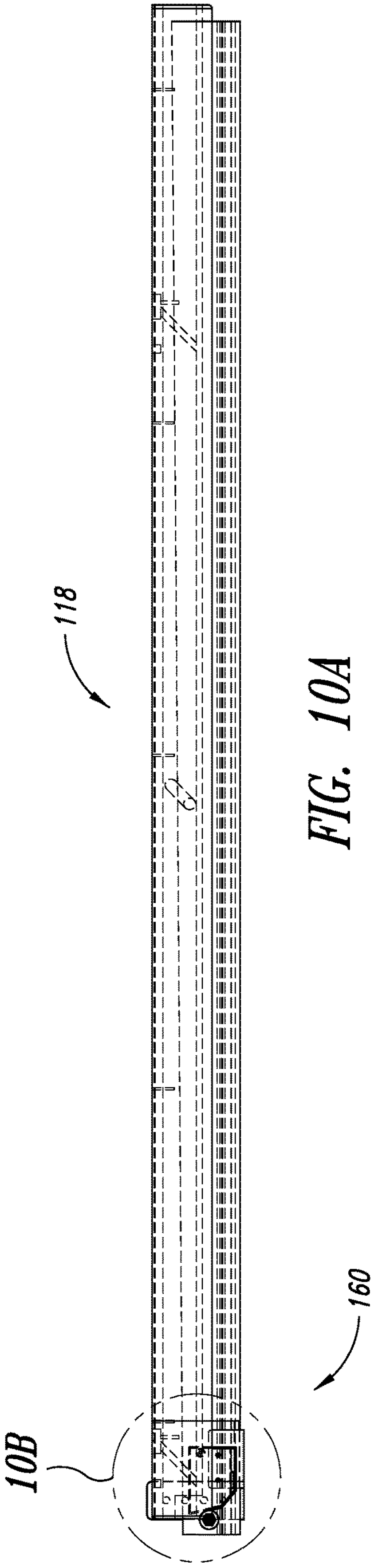
FIG. 10A is an elevational view of the drop seal assembly of FIG. 3 and the sill guide of FIGS. 7A-7C, according to one illustrated implementation.
Figure 10B:
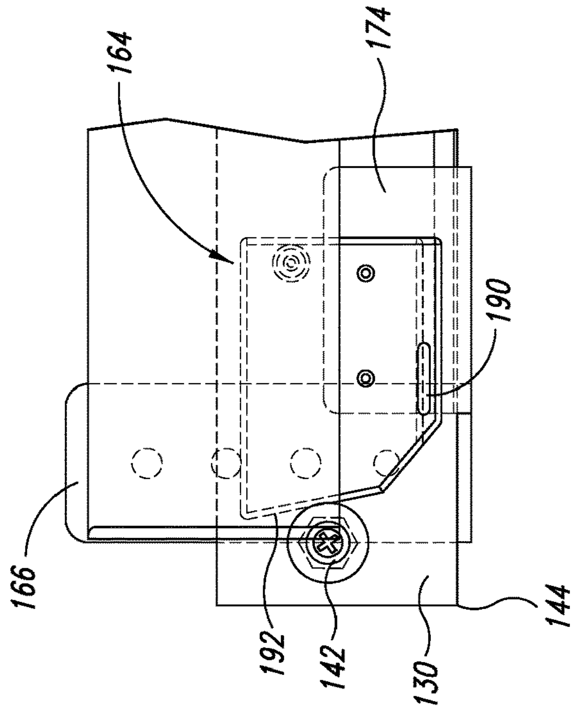
FIG. 10B is a detailed view of a portion of FIG. 10A designated as detail A, according to one illustrated implementation.
Figure 11:
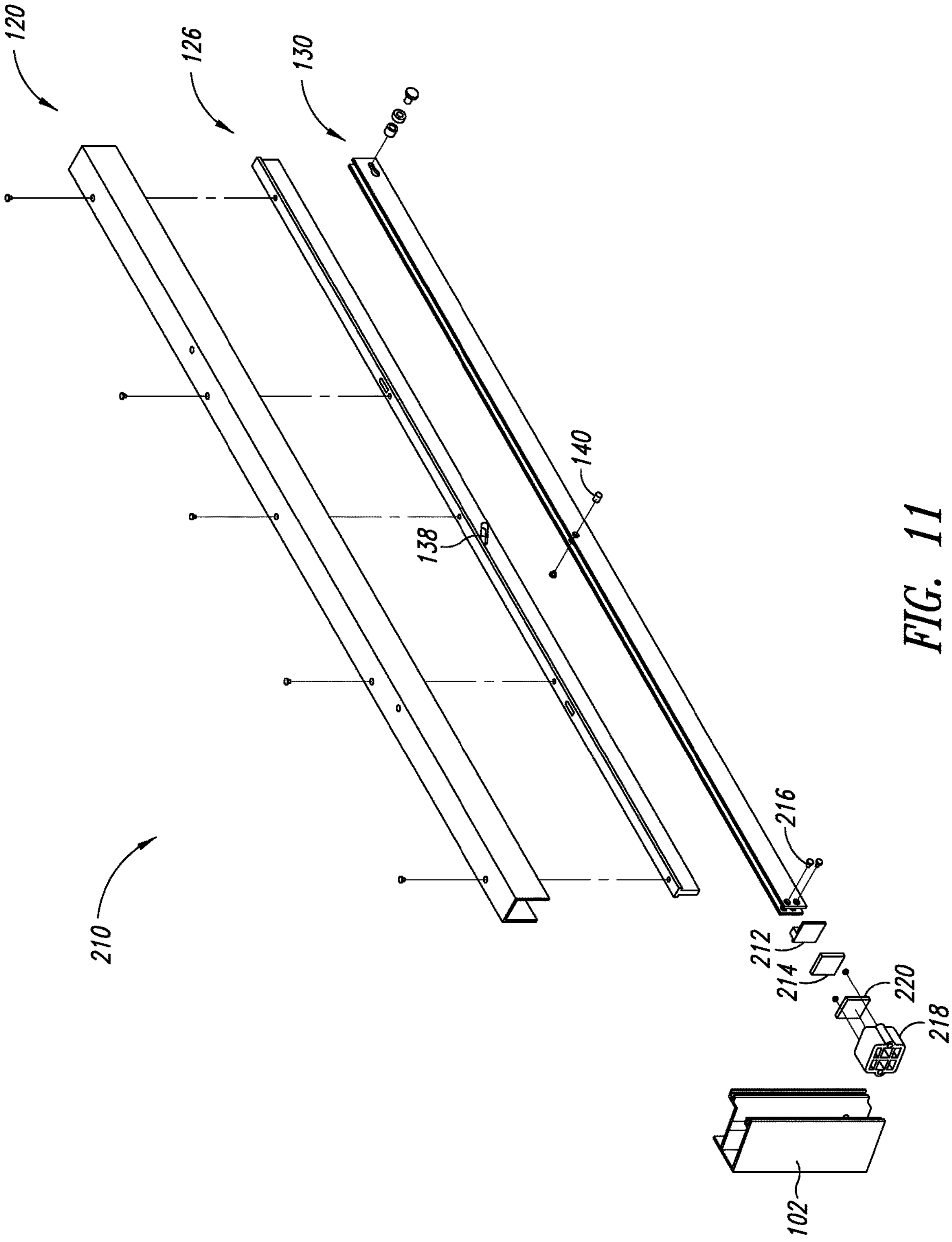
FIG. 11 is an exploded perspective view of a drop seal assembly which includes a concealed magnetic bottom seal activator, according to one illustrated implementation.
Figure 12B:
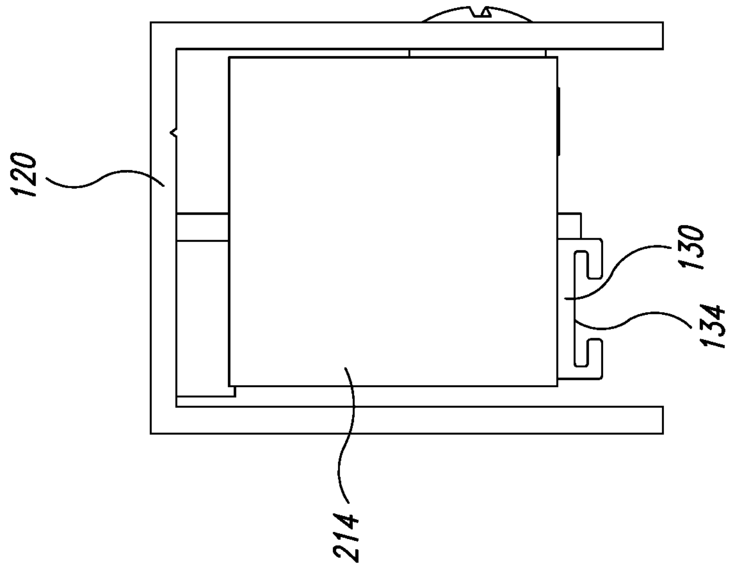
FIG. 12B is a leading end view of the drop seal assembly of FIG. 11, according to one illustrated implementation.
Figure 12A:
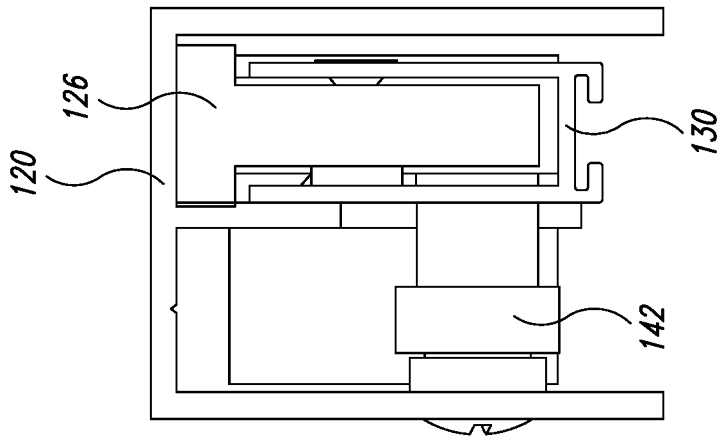
FIG. 12A is a trailing end view of the drop seal assembly of FIG. 11, according to one illustrated implementation.
Figure 13:
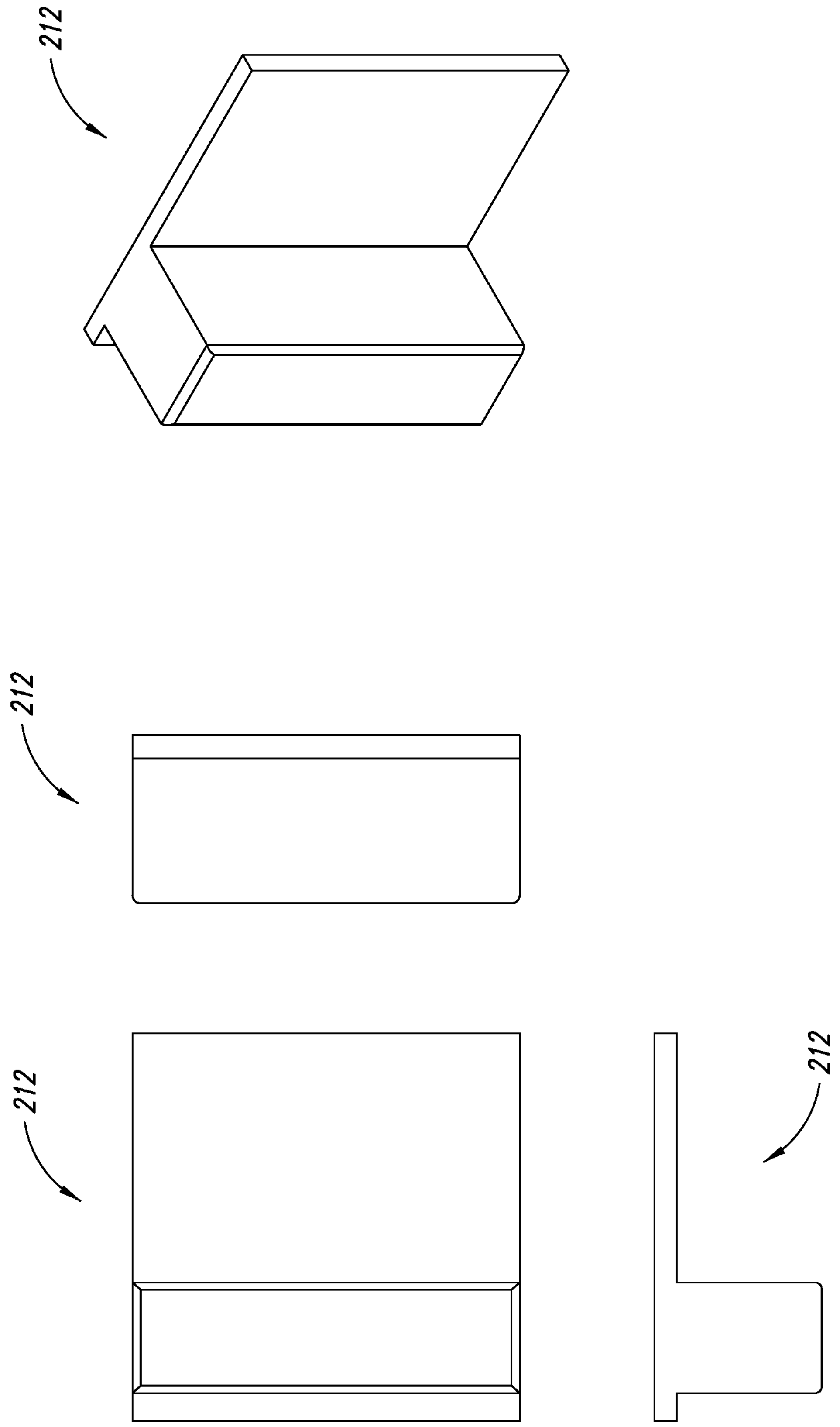
FIG. 13 shows various views of a magnetic bracket of the drop seal assembly of FIG. 11 which supports a first magnet, according to one illustrated implementation.
Figure 14:
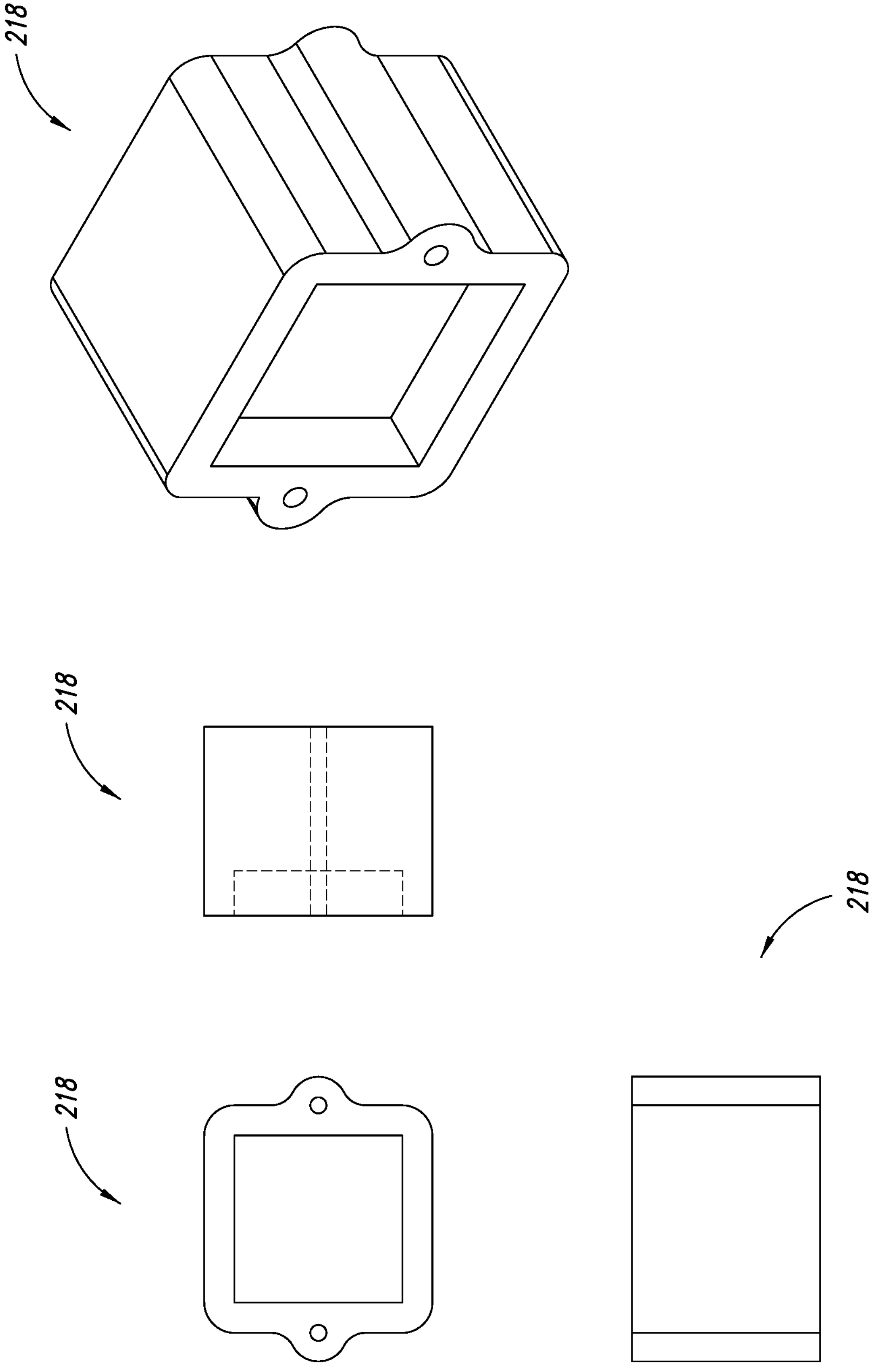
FIG. 14 shows various views of a magnetic bracket which is coupled to a stile pocket of a door frame and supports a second magnet which opposes the first magnet of the drop seal assembly of FIG. 11, according to one illustrated implementation.
Figure 15A:
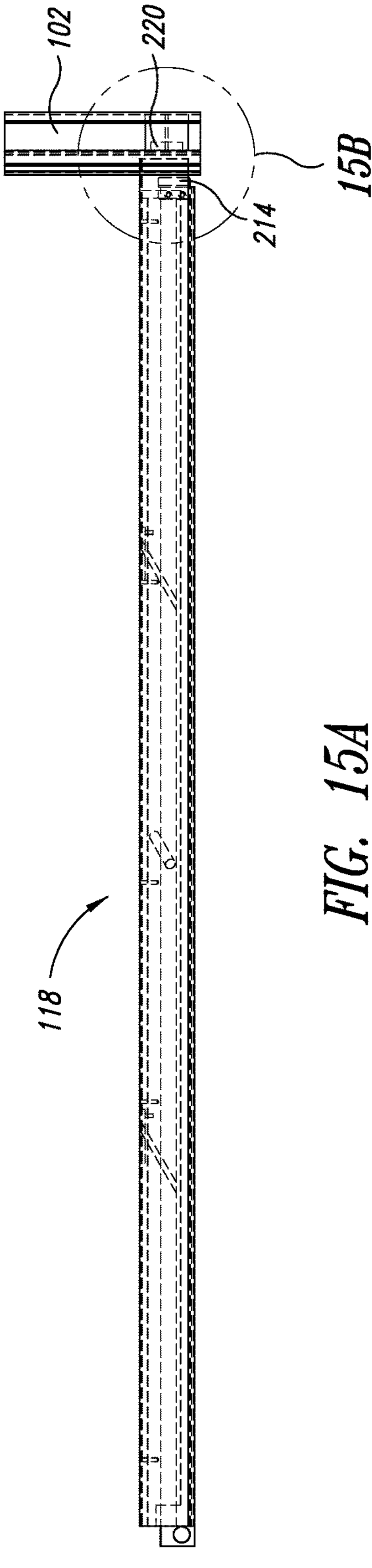
FIG. 15A is an elevational view of the drop seal assembly and stile pocket of FIG. 11, according to one illustrated implementation.
Figure 15B:
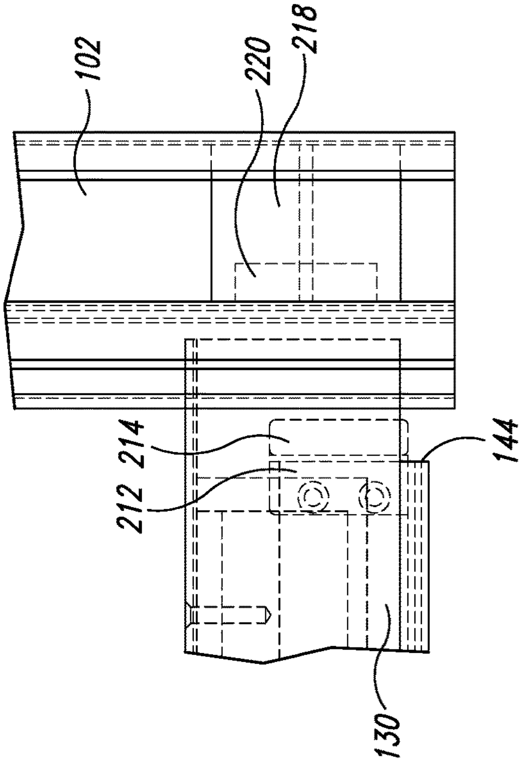
FIG. 15B is a detailed view of a portion of FIG. 15A designated as detail A, according to one illustrated implementation.

As shown best in FIG. 10B, when the door panel 104 carrying the drop seal assembly 118 slides toward the closed position, the wheel bearing 142 attached to the carriage extrusion 130 contacts an angled bearing surface 192 of the bumper 164 of the adjustable sill guide 160, which imparts a horizontal force on the carriage extrusion, which causes the carriage extrusion to drop down at the angle of the guide slot 138 in which the pin 140 rides against the force of the biasing springs 150 so that the seal 132 contacts and presses against the floor surface.

Referring back to FIG. 7A, by adjusting in which detent location of the slot 178 the pin 180 resides, the horizontal location of the bumper 164 may be selectively adjusted. In particular, the bumper 164 may be moved toward the latch jamb of the door frame 102 such that the bearing 142 contacts the bearing surface 192 of the bumper 164 later when the door panel 104 is closed to reduce the drop distance. Similarly, the bumper 164 may be moved away from the latch jamb of the door frame 102 such that the bearing 142 contacts the bearing surface 192 earlier when the door panel 104 is closed to increase the drop distance, thereby accommodating installations which have varying air gaps between the bottom 110 of the door panel 104 and the floor surface.

Figure 8:
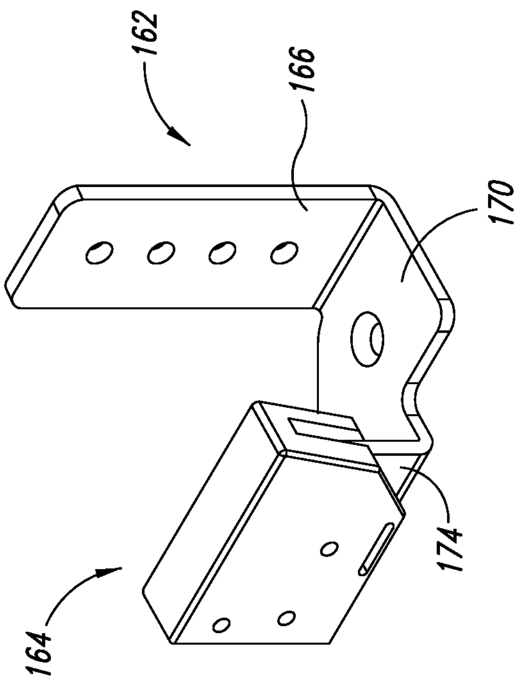
FIG. 8 is an isometric view of an adjustable sill guide for a sliding door panel which opens to the right, according to one illustrated implementation.

FIG. 8 shows an implementation for an adjustable sill guide 200 which may be used for a door panel which opens to the right. The adjustable sill guide 200 is substantially similar to the adjustable sill guide 164, so a detailed discussion of the sill guide 200 is not required.

FIGS. 11-15B show various views of a drop seal assembly 210 which utilizes a magnetic drop seal activator. The drop seal assembly 210 is similar in many aspects to the drop seal assembly 118 discussed above, so only differences between the drop seal assembly 210 and the drop seal assembly 118 are discussed herein for the sake of brevity.

In this implementation, instead of activation of the drop seal assembly 210 by the wheel bearing 142 contacting the bumper 164 of the adjustable sill guide 160, opposing magnets are used to drive the carriage extrusion 130 downward from the raised position to the lowered position. In particular, a first magnet bracket 212 which supports a first magnet 214 is coupled to the leading end 144 of the carriage extrusion 130 via screws 216. A second magnet bracket 218 which supports a second magnet 220 is coupled to the door frame 102 (e.g., stile pocket) at a position that is horizontally aligned with the first magnet 214 (see FIGS. 15A-15B).

The first magnet 214 and the second magnet 220 are oriented such that the same poles face each other (i.e., North pole facing North pole, or South pole facing South pole), which causes a repelling force between the first magnet 214 and the second magnet 220 when the first magnet is brought into proximity of the second magnet as the door panel 104 is moved from the open position into the closed position. Thus, instead of pulling the carriage extrusion 130 backward when the door panel 104 closes using the wheel bearing 142, as discussed above, in this implementation the carriage extrusion 130 is pushed backwards using the repelling force between the first magnet 214 and the second magnet 220 to cause the carriage extrusion to move as described above from the raised position to the lowered position.

One advantage of the magnetic drop seal activator implementation is that the system is self-adjusting. The air gap between the first and second magnets 214 and 220 allows for variation in distances between the bottom 110 of the door panel 104 and the floor surface. In particular, the force between the first magnet 214 and the second magnet 220 when the door panel 104 is in the closed position is strong enough to drive the carriage extrusion 130 downward such that the seal 132 compresses against the floor surface, but the force is not so strong so as to prevent the door panel 104 from shutting and/or remaining in the closed position. In other words, if the floor surface is lower relative to the bottom 110 of the door panel 104, the magnetic force between the first and second magnets 214 and 220 drives the carriage extrusion 130 downward to the lower floor surface for a range of distances between the bottom 110 of the door panel 104 and the floor surface.

In at least some implementations, a fixed or non-adjustable sill guide may be positioned in the still guide channel 124 of the E-channel extrusion 120 to prevent the bottom 110 of the door panel 104 from swinging outward from the door frame 102 and wall 106. In installations which do not include a drop seal assembly, the same fixed sill guide may be used. Thus, another advantage of the magnetic drop seal activator implementation is that the same fixed sill guide may be used for all types of installations including those which include a drop seal assembly and those which do not include a drop seal assembly.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of various implementations. Those of skill in the art will recognize that many of the examples set out herein may employ additional elements and/or may omit some elements. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure. This application also claims the benefit of U.S. Provisional Patent Application No. 62/442,623, filed Jan. 5, 2017, and is incorporated herein by reference in its entirety.

The invention claimed is:

1. A door seal system for a top-hanging sliding door including a door panel that is slideable between an open position and a closed position, in which the door panel covers an opening, the door seal system comprising:

- a drop seal assembly physically coupled to a bottom portion of the door panel, the drop seal assembly including an elongated carriage having a seal disposed on a bottom side thereof which faces a floor surface below the door panel, the carriage movable between a raised position wherein the seal is spaced apart from the floor surface, and a lowered position wherein the seal is in contact with the floor surface, and the carriage is biased in the raised position and movable from the raised position to the lowered position responsive to an external activating force applied to the carriage;
- a drop seal assembly activator, in operation the drop seal assembly activator imparts the activating force on the carriage as the door panel is moved from the open position toward the closed position to cause the carriage of the drop seal assembly to move from the raised position to the lowered position, wherein the drop seal assembly activator includes a sill guide that prevents the door panel from swinging away from the opening, the sill guide having a bearing surface that imparts the activating force on the drop seal assembly when the door panel is moved from the open position to the closed position; and
- a wheel bearing extending from the elongated carriage, the wheel bearing configured to contact the bearing surface when the door panel is moved from the open position to the closed position, such that the wheel bearing vertically moves in the same direction as the elongated carriage, wherein a horizontal position of the bearing surface of the sill guide is selectively adjustable relative to a coupling of the sill guide to the floor, and the horizontal position of the bearing surface of the sill guide controls the height of the carriage when the carriage is in the lowered position.

2. The door seal system of claim 1 wherein the carriage of the drop seal assembly comprises a fixed pin, and the drop seal assembly further comprises an elongated guide bar which is fixed relative to the door panel, the guide bar includes an angled slot therein which receives the fixed pin of the carriage, and the fixed pin rides in the angled slot responsive to the activating force imparted on the carriage by the drop seal assembly activator to control movement of the carriage between the raised position and the lowered position.

3. The door seal system of claim 2 wherein the drop seal assembly further comprises at least one spring coupled between the elongated guide bar and the carriage, the at least one spring biases the carriage in the raised position.

4. The door seal system of claim 2 wherein the angled slot of the elongated guide bar is disposed at an angle that is between 30 degrees and 45 degrees with respect to a longitudinal dimension of the elongated guide bar.

5. The door seal system of claim 1 wherein the bearing surface is coupled to the carriage proximate a trailing end of the door panel.

6. The door seal system of claim 1 wherein the seal is an elastic seal.

7. A top-hanging sliding door, comprising:

- a door panel comprising a bottom portion having a downward facing opening therein and being slideable between an open position and a closed position, in which the door panel covers an opening; and
- a door seal system, comprising:
  - a drop seal assembly disposed at least partially within the downward facing opening of the door panel, the drop seal assembly including an elongated carriage having a seal disposed on a bottom side thereof which faces a floor surface below the door panel, the carriage movable between a raised position wherein the seal is spaced apart from the floor surface, and a lowered position wherein the seal is in contact with the floor surface, and the carriage is biased in the raised position and movable from the raised position to the lowered position responsive to an external activating force applied to the carriage;
  - a drop seal assembly activator, in operation the drop seal assembly activator imparts the activating force on the carriage as the door panel is moved from the open position toward the closed position to cause the carriage of the drop seal assembly to move from the raised position to the lowered position, wherein the drop seal assembly activator includes a sill guide that prevents the door panel from swinging away from the opening, the sill guide having a bearing surface that imparts the activating force on the drop seal assembly when the door panel is moved from the open position to the closed position; and
  - a wheel bearing extending from the elongated carriage, the wheel bearing configured to contact the bearing surface when the door panel is moved from the open position to the closed position, such that the wheel bearing vertically moves in the same direction as the elongated carriage, wherein a horizontal position of the bearing surface of the sill guide is selectively adjustable relative to a coupling of the sill guide to the floor, and the horizontal position of the bearing surface of the sill guide controls the height of the carriage when the carriage is in the lowered position.

8. The top-hanging sliding door of claim 7 wherein the carriage of the drop seal assembly comprises a fixed pin, and the drop seal assembly further comprises an elongated guide bar which is fixed relative to the door panel, the guide bar includes an angled slot therein which receives the fixed pin of the carriage, and the fixed pin rides in the angled slot responsive to the activating force imparted on the carriage by the drop seal assembly activator to control movement of the carriage between the raised position and the lowered position.

9. The top-hanging sliding door of claim 8 wherein the drop seal assembly further comprises at least one spring coupled between the elongated guide bar and the carriage, the at least one spring biases the carriage in the raised position.

10. The top-hanging sliding door of claim 8 wherein the angled slot of the elongated guide bar is disposed at an angle that is between 30 degrees and 45 degrees with respect to a longitudinal dimension of the elongated guide bar-horizontal.

11. The top-hanging sliding door of claim 7 wherein the bearing surface is coupled to the carriage proximate a trailing end of the door panel.

12. The top-hanging sliding door of claim 6 wherein the seal is an elastic seal.

* * * * *